No. 818,305. PATENTED APR. 17, 1906.
E. A. SMITH.
MEANS FOR DRESSING FISH.
APPLICATION FILED MAY 21, 1902.
2 SHEETS—SHEET 1.
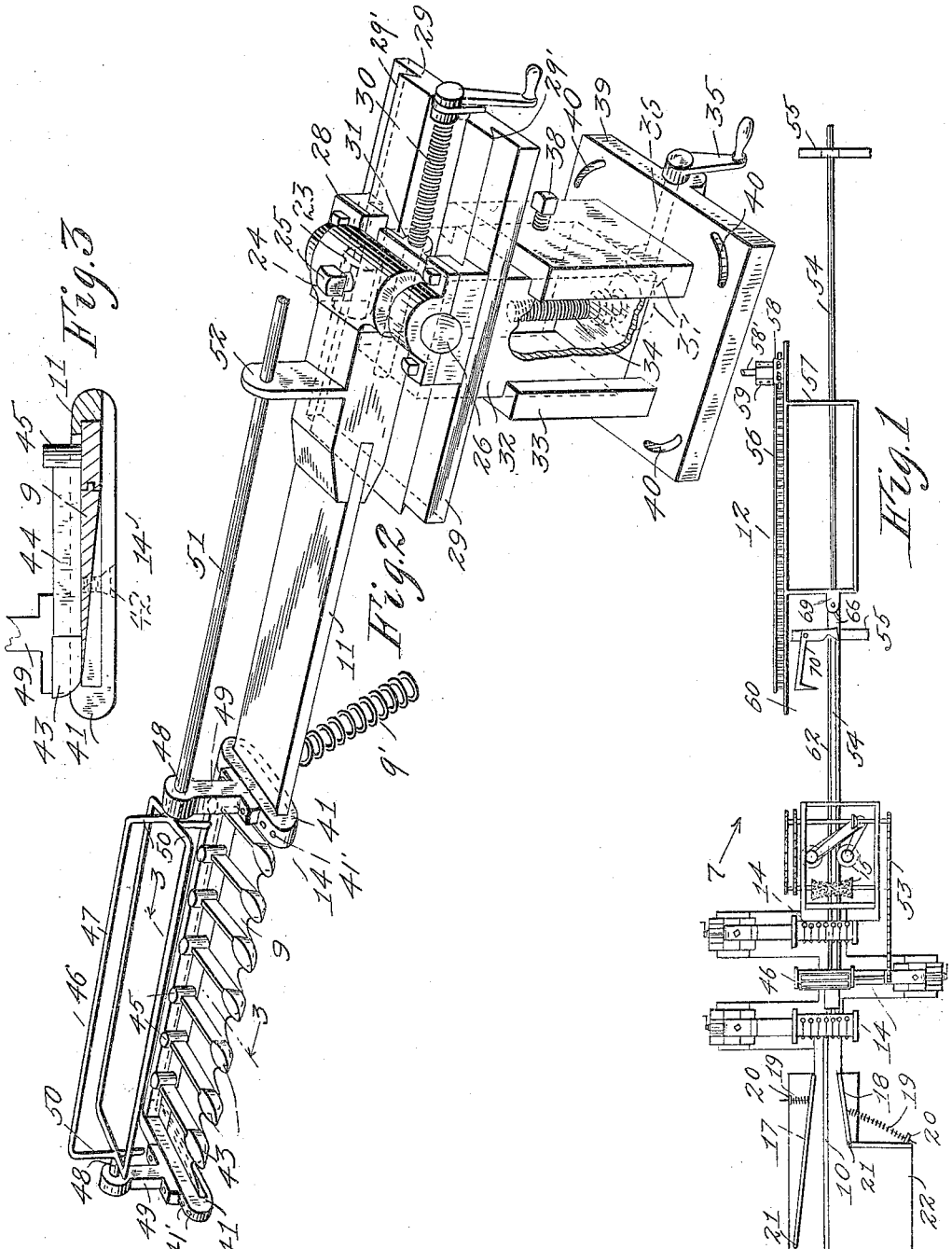
WITNESSES:
Arlita Adams
William P. Smith
INVENTOR
Edmund A. Smith
BY Frank E. Adams
ATTORNEY.

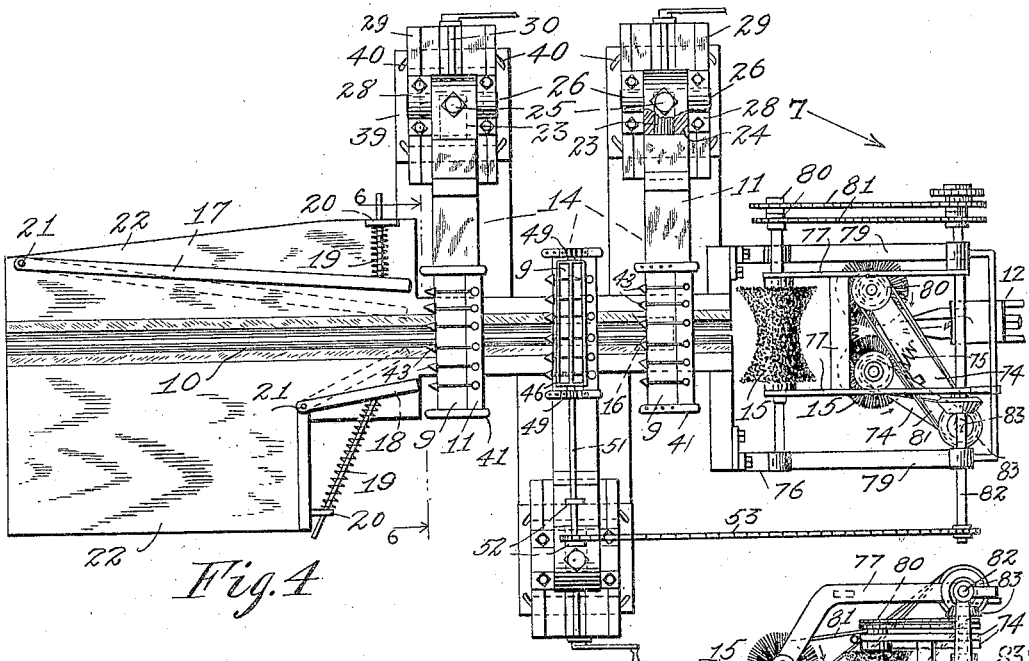
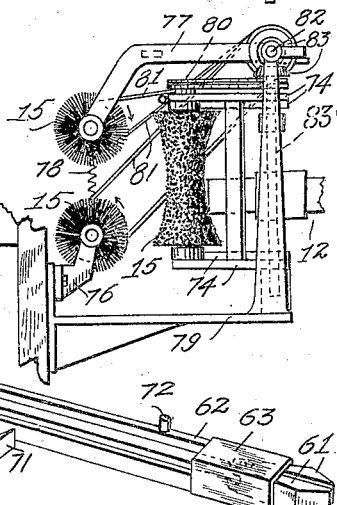
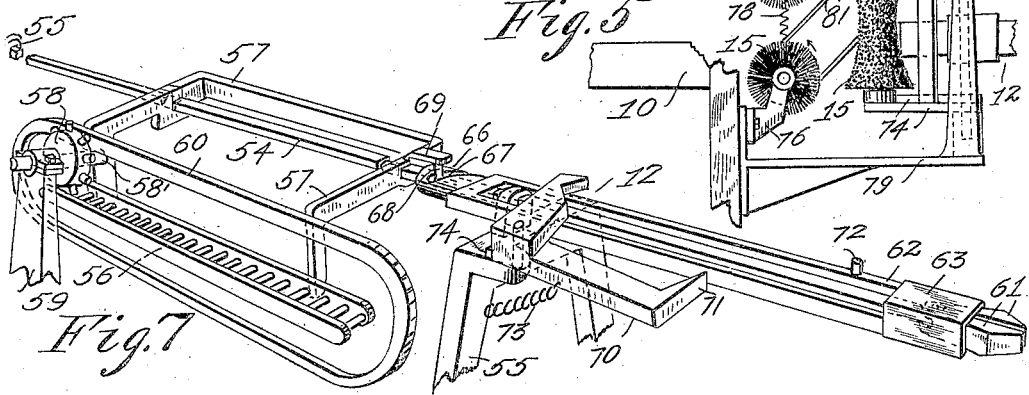
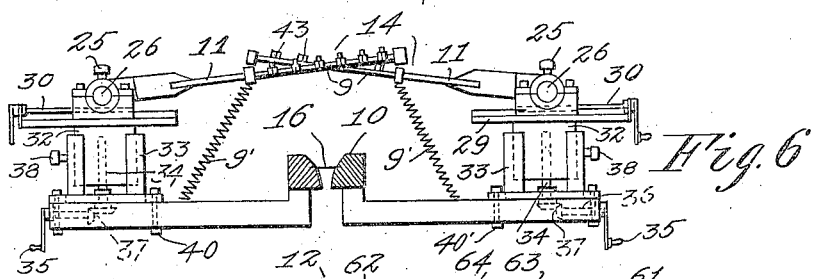

UNITED STATES PATENT OFFICE.

EDMUND AUGUSTINE SMITH, OF SEATTLE, WASHINGTON, ASSIGNOR TO THE SMITH CANNERY MACHINES COMPANY, OF SEATTLE, WASHINGTON, A CORPORATION OF WASHINGTON.

MEANS FOR DRESSING FISH.

No. 818,305.     Specification of Letters Patent.     Patented April 17, 1906.

Application filed May 21, 1902. Serial No. 108,405.

*To all whom it may concern:*

Be it known that I, EDMUND AUGUSTINE SMITH, a citizen of Canada, (but having declared my intention to become a citizen of the United States of America,) and a resident of the city of Seattle, in the county of King and State of Washington, have invented certain new and useful Improvements in Means for Dressing Fish, of which the following is a specification.

My invention relates to improvements in device adapted to dress or clean fish, and has special reference to a machine for this purpose which acts to remove the fins and slime the fish.

Among numerous objects attained by this invention and readily understood from the following specification and accompanying drawings included as a part thereof is the production of simple and efficient instruments for removing the fins from fish without danger of mutilating or bruising the body thereof, preferred means whereby fish are expeditiously handled during the process of dressing and sliming, and important structural features incidentally developed in accomplishing the objects.

The above-mentioned and numerous other objects equally as desirable are attained by the construction, combination, and arrangement of parts as disclosed on the drawings, set forth in this specification, and succinctly pointed out in the appended claims.

With reference to the drawings filed herewith and bearing similar reference characters for corresponding parts throughout the several views, Figure 1 is a plan view of the entire dressing-machine on reduced scale, with the several parts indicated in relative position when about to commence operations on a fish. Fig. 2 is a perspective view, on large scale, of one of the instruments or knives adapted to sever the fins from the body of the fish removed from the machine and indicated as preferably mounted and with portions of the mount broken away to better disclose the arrangements and form of the several parts. Fig. 3 is a transverse section of the knife, on large scale, taken on line 3 3 of Fig. 1, viewed as the arrows indicate. Fig. 4 is a plan view, on large scale, of the head-end portion of the machine, showing the fish-table, fishway, and apparatus for removing the fins and sliming the fish, and also indicates the head of the drag adapted to handle the fish. Fig. 5 is a side elevation of the sliming apparatus and the head of the drag. Fig. 6 is a transverse section of the head end of the machine, taken on line 6 6 of Fig. 4, viewed as the arrows fly and with the sliming apparatus removed. Fig. 7 is a perspective view of the drag preferably employed to pull the fish through the finning and sliming apparatus, viewed as the arrows marked 7 in Figs. 1 and 4 indicate, and shown with portions broken away and the parts in relative position when the drag is about to act to draw or pull the body or fish; and Fig. 8 is a horizontal transverse section of the head of the drag, on large scale, and indicates the fish-gripping jaws in open position.

This invention includes a suitable way, as 10, adapted to slidably support the body to be dressed, a drag, as 12, by which the body can be expeditiously pulled along the way, instruments, as knives 14, arranged across the path of movement of the body as drawn along said way and adapted to operate thereon to dress the body, and suitable wipers, as rotating brushes 15, between which the body is passed for the purpose of sliming or cleaning.

Before proceeding to set up and describe the several parts of the invention in their present preferred form and embodiment the advantages offered in handling bodies to be dressed or cleaned, as fish, by drawing or pulling them bodily during operations thereon will be comprehensively set forth, so that the scope of the invention may be more readily marked, and in furtherance of a clearer understanding of these advantages it should be remembered that the flesh in the body of a dead fish when lying upon a carrier or like transporting appliance is soft and pliable, and in consequence of this yielding flabby condition of the flesh it is exceedingly difficult to operate thereupon, as required to sever the fins and otherwise dress the fish without mutilating the body. By handling the fish with a suitable drag, whereby it can be pulled bodily along a way, the body of the fish is placed under a tension proportionate to frictional resistance to its passage and the flesh of the fish is thereby given a certain rigidity and tenseness which greatly facilitates the operations of dressing and renders the work more perfectly and expeditiously performed.

As now considered, the fishway 10 is placed horizontal and rendered in the form of a groove or channel, preferably made substantially V shape in cross-section, with the bottom left open to conveniently accommodate the dorsal fin of the fish, which is preferably drawn into the machine tail foremost and resting with the back in this groove or way, and a suitable blade, as 16, is disposed across the way at a convenient point, with the cutting edge arranged to sever the dorsal fin close to the body as the fish is drawn along the way. This blade is preferably fixed in its position and comprises a section of suitable metal having a V-shaped indenture sharpened along the edge to provide the cutting edge of the blade.

In the present embodiment suitable means are provided to resist movement of the fish along the way, and thereby increase the tension on the body, and as now considered oppositely-disposed vertical plates 17 and 18 are suitably movably mounted at each side of the fishway and are conveniently yieldingly forced to clamp the fish by means of coiled springs, as 19, which are each confined between a respective plate and a suitably-fixed lug 20. Each of these resistance-plates are preferably pivotally mounted for movement at one end on respective vertically-disposed pivots, as 21, which are secured to the table 22, adapted to receive the fish at the head end of the machine, so as to cause the free ends of the plates to lie opposite to each other, and the springs 19 are suitably disposed to yieldingly force these ends of the plates to approach each other and clamp the body of the fish, and thereby offer additional frictional resistance to its movement.

The knives or instruments 14 are rendered of substantially identical form, and each comprises a blade, as 9, preferably removably seated on a suitable shank 11, which is conveniently movably mounted for adjustment universally, so as to widen the scope of the application of the knife. In the present instance this shank is formed with a suitable longitudinally-disposed pivot, as 23, fixed to the rear end surface, and this pivot is rotatably seated in a socket, as 24, whereby the shank can be rotatably adjusted to conveniently vary the angle or pitch of the knife-blade, and a set-screw 25 is arranged in the wall of this socket to normally secure the shank. The socket 24 is preferably supported on trunnions 26, arranged on a line with but at right angles to the axis of the knife, so that the blade thereof is conveniently rendered movable relatively to its normal position by a swinging movement, which renders it self-adjusting relatively to the body of the fish and in conformity with the size thereof, and a spring, as 9', is conveniently connected to the knife to normally yieldingly hold it constantly against the body of the fish in fin-cutting relations thereto. The trunnions 26 are journaled in a suitable slide-box, as 28, which is movably mounted on a base-plate 29 and slidably engaged therewith by suitable guides, as 29', and adjusted along said guides by means of a screw 30, rotatably mounted on the base and engaged with a nut 31, fixed to said box, so that the knife may be adjusted longitudinally as desired when the blade becomes dull at any one point. This base is formed with a downwardly-extending hollow stem 32, which is slidably mounted for vertical adjustment in a suitable standard, as 33, to conveniently regulate the longitudinal pitch of the knife-blade, Fig. 6, and is raised and lowered by a vertically-disposed screw 34, rotatably mounted at the lower end of the standard and engaged with suitable screw-threads formed in the end wall of the stem 32, and this screw is operated by a handle 35, secured to a shaft 36, which is suitably journaled on the standard at right angles to the screw and operably connected thereto by a pair of bevel-gears 37, and a set-screw 38 is engaged in a screw-threaded aperture in the wall of the standard, so that the end can be brought to clamp the said stem, and thereby secure the base-plate at any desired elevation. The standard 33 is preferably formed with a flange, as 39, at the lower end, which is provided with segmental bolt-apertures 40, arranged concentric with the axis of screw 34, and in which bolts, as 40', Fig. 6, employed to secure the standard, are placed, and thereby upon loosening these bolts the standard can be rotatably shifted to regulate the lead of the knife.

As preferably embodied the knife-blade 9 is rendered with a serrated cutting edge, Fig. 2, and formed substantially wedge shape as viewed in cross-section and is conveniently removably seated in sockets formed in collars, as 41, disposed on the shank 11 at points suitably separated to receive the end portions of the blade, and the socket at the outer end of the shank is extended entirely through the collar, so that the blade may be inserted in place by slipping it endwise therethrough, when screws, as 42, Fig. 3, which are seated in the collars, can be adjusted to clamp and hold the blade.

The knife 14 is preferably provided with suitable riders or shoes, as 43, adapted to contact the body of the fish, and thereby guide the knife-blade in conformity with the contour thereof and support same in true cutting relations to properly sever the fins, but prevent gouging. These shoes are arranged with the toes thereof slightly in advance of the cutting edge of the blade 9 and as now considered are disposed on each tooth thereof and preferably yieldingly held in normal position by stems 44, to the free ends of which they are suitably fixed, and these stems are preferably composed of bars of resilient material and mounted on suitable lugs, as 45, disposed on the shank 11, so as to cause the stems to normally lie transversely the upper surface of the blade, so that they will bend to allow the shoes to separate and receive the fish-fin, which will pass beyond the heel of the shoes and be thereby more securely held from passing beneath the knife. As now considered these shoes are each formed with the under surface of the toe curved upwardly and the side surfaces converging outwardly, so as to ride the body and receive the fins more perfectly.

In operating on fish having unusually-pliable fins it is found desirable to take extra precaution to prevent the fins from passing beneath the knife, and in this case I have provided a rotatable guard, as 46, Fig. 2, which consists of a series of wings, as 47, projecting laterally from a suitable shaft, as 48, disposed longitudinally the knife-blade and rotatably mounted in stands, as 49, which are movably mounted on the collars 41 by providing a series of screw-threaded apertures 41' in the collars adapted to receive the screws for securing the stands in place, and thereby render them adjustable transversely the knife to bring the outer edges of the wings in proper fin-engaging relations to the cutting edge of the blade, so that they will act to press the fin downwardly upon the blade and carry it rearwardly as the guard is properly rotated. These wings are preferably composed of rods disposed parallel the axis of rotation of the guard and supported at the ends of suitable arms 50, secured to said shaft, which is preferably extended longitudinally the knife-shank and includes a suitable flexible section 51, adapted to allow the stands supporting the guard to be adjusted as desired, and the outer end of this shaft is suitably supported by journals 52, fixed to the shank of the knife, and is rotated by means of a sprocket-wheel mounted thereon between the journals 52 and driven by a belt 53.

In assembling the machine the knives 14 are preferably disposed at opposite sides of the fishway at predetermined points beyond the table 22 to insure their acting at different times to sever the fins, and as now considered three of these knives are used and are arranged with the blades above the way and so disposed as to normally lie in the path of movement of the fish as pulled therealong, and the first one of these knives from the head end of the machine is set to sever the anal fin and the other two are set to sever the ventral fin on a respective side of the fish, while the knife 16 serves to remove the dorsal fin, as heretofore set forth, the pectoral fins, gills, and head having been previously preferably removed from the body before the fish is passed through the machine.

In the present instance suitable mechanical means, as a drag 12, is employed to pull the body to be dressed along the way, and this drag comprises a longitudinally-reciprocal plunger 54, slidably mounted in stands, as 55, but conveniently held from rotation by forming the plunger rectangular in cross-section, and this plunger is operated by means of a movable mangle-rack 56, which is arranged at one side thereof and secured to a frame 57, suitably connected to said plunger, so as to travel therewith and move rotatably thereon. This rack is actuated by a pin-tooth pinion, as 58, fixed to a rotatable shaft 58', journaled in a stand 59, with the end projecting beyond said pinion, and a continuous track 60 is secured to the frame 57 about the rack, so as to run on said end of the shaft, and thereby insure constant and proper mesh of the pinion. A pair of jaws, as 61, are suitably pivotally mounted on the head end of plunger 54 by a pivot, as 61', disposed at right angles to the line of action of the plunger, and these jaws are adapted to grip the tail of the fish when the plunger is in advanced position and open to release the tail when in retracted position. These jaws are opened and closed by reciprocal partial rotations of the frame 57 about the plunger 54 by suitable means, as a slide-bar 62, having a socket-head 63 embracing the jaws and formed with interior surfaces, as 64, arranged to contact the shanks of the jaws as the head is moved outwardly on the plunger, and thereby cause the jaws to close, and having a pin 65 disposed between the jaws, so as to contact the shanks thereof and open the jaws as the head is retracted. This bar is slidably mounted on the plunger and is extended rearwardly to a point closely adjacent the frame 57, and a cam 66, having a helical slot 67, is fixed to this end of the bar and is adapted to coact with a pin 68, depending from a forwardly-projecting bracket 69, fixed to the frame, whereby upon moving the frame rotatively the said pin is made to move the bar longitudinally of the plunger, and consequently open or close the jaws 61.

In the present construction of the machine a knife, as 70, is suitably arranged to sever the tail from the body of the fish just prior to opening action of the jaws 61, and this knife is operably related to the plunger 54 and is conveniently rendered with the shank in the form of a bell-crank and is pivoted on the forward stand 55, with one arm extended across the plunger and the other arm extended forwardly and formed with a blade 71 at the free end projecting inwardly, and this knife is operated by a suitable pin or lug 72, secured to the bar 62, so as to contact the inwardly-projecting arm of the knife as the plunger is retracted, and thereby cause the knife to swing and the blade thereof to pass across the ends of jaws 61 and sever the tail from the body of the fish, and this knife is yieldingly held in normal position by a suitable spring, as 73, which returns and sets it against a lug, as 74, after each operation.

The sliming apparatus of the machine as now considered includes wipers 15, arranged in pairs, with one wiper disposed at each side of the path of movement of the fish as drawn by the drag 12, and these wipers are preferably placed in rear of the knives 14, so as to act to slime the fish after the fins thereof are removed, and they comprise two pair of rotatable cylindrical brushes, one pair of which is disposed in a horizontal position and the other pair in a vertical position, and each wiper is formed with the periphery concaved to better cover the entire surface of the body of the fish and are composed of radially-disposed wire bristles attached to a suitable core. The vertically-disposed brushes are rotatably mounted on the free ends of suitably-supported swinging arms, as 74, and are yieldingly forced toward each other by suitable springs, as 75, arranged to draw said arms toward each other, so as to bring the wipers to positively contact the fish, but still lie free to open or close in conformity with the size and contour of the body, and the lower brush of the horizontally-disposed pair is suitably mounted in fixed journals, as 76, while the upper brush is on swinging arms 77, which are yieldingly forced downwardly by a suitable spring, as 78. The arms carrying these brushes are pivotally mounted in a suitably-constructed frame, as 79, in any convenient manner, and the cores of the brushes are suitably extended to receive sprocket-wheels, as 80, adapted to receive motion from respective belts 81, arranged in a suitable manner to cause the brushes to act upon the fish in opposition to its movement and conveniently driven from a drive-shaft 82 and a counter-shaft, as 83, coupled together by bevel-gears 83', and the belt 53, adapted to drive the guard 46, is conveniently driven from a suitable sprocket mounted on the shaft 82.

Granting the construction of a machine substantially as heretofore set forth and support of the way, table, and knives and the application of suitable power to drive the drag and sliming apparatus, an operation thereof to dress fish would occur about as follows: The tender would take position at the fish-table 22 and place a fish on its back upon the way 10 and force it between resistance-plates 17 and 18, with the tail well under the forward knife 14, and as the plunger 54 of the drag reaches advanced position the jaws 61 open to receive the fish-tail and then close and grip the same and the plunger retracts and pulls the fish by its tail extremity along the way. The riders or shoes 43 serve to adjust their respective knives in conformity with the size of the body, while the springs 9' serve to yieldingly hold the blades of the knives in true fin-cutting relations, and the fins of the fish are thereby severed from the body, and as the fish is still further moved it is pulled between the wipers 15, which serve to remove the slime therefrom, and as the body passes free of these wipers the knife 70 acts to cut it free of the tail, when the fish will fall clear of the machine. The jaws 61 are then opened to release the severed tail portion, as hereto set forth, which also drops, and the plunger is then again advanced.

The operation of the drag will be readily understood, as it will be seen that continuous rotation of the pinion 58 causes the rack 56 to move thereacross until one end thereof reaches the pinion, when the track 60 serves to maintain the mesh, while the pinion passes the rack to the opposite side of the face, and thereby rotates or swings the frame 57, which in turn actuates the slide-bar 62, and consequently the jaws 61, as heretofore set forth.

Having thus described my invention, what I claim as new, and desire to secure by Letters Patent of the United States of America, is—

1. In a machine of the nature indicated, the combination with a movable toothed cutting instrument, of a plurality of yielding coacting riders mounted thereon one above each tooth of said instrument, said riders adapted to contact the body to be operated upon and thereby guide the instrument relatively to said body.

2. In a machine of the nature indicated, the combination with a movable fin-severing knife normally yieldingly held in cutting position, of a plurality of yielding coacting shoes mounted thereon and arranged along the edge of said knife and adapted to ride the body of the fish and thereby guide the knife over said body.

3. In a machine of the nature indicated, the combination with a movable fin-severing knife having a flat blade normally yieldingly held in cutting position, of a series of movable shoes mounted on said knife along the edge of said blade and normally yieldingly held in relative position to each other.

4. In a machine of the nature indicated, the combination with a fin-severing knife having its blade normally yieldingly held in cutting position, of a series of coacting shoes disposed along the edge of said knife and adapted to open and close relatively to each other, and means to yieldingly support the shoes in normal position.

5. In a machine of the nature indicated, the combination with a movable fin-severing knife having a flat blade normally yieldingly held in position, of a series of shoes disposed along the edge of said knife with the toes projecting forwardly thereof, and resilient stems supported transversely said blade and adapted to carry said shoes.

6. In a machine of the nature indicated; the combination with a movable fin-severing knife having a serrated cutting edge, of coacting body-riders disposed along the edge of said knife at the points of the serrations.

7. In a machine of the nature indicated; a knife comprising a shank having a blade at one end, a series of movable riders disposed along the edge of the blade at one side and adapted to open and close relatively to each other, and means to yieldingly support said riders in normal position.

8. In a machine of the nature indicated; a knife comprising a shank having a blade at one end, a series of stems disposed transversely of said blade and mounted on the knife, and shoes yieldingly fixed to said stems along the cutting edge of the blade.

9. In a machine of the nature indicated; a knife comprising a shank having a blade at one end, a series of resilient stems disposed transversely of said blade and secured by one end to the knife adjacent the back edge, and shoes fixed to said stems with their toes beyond the cutting edge of said blade.

10. In a machine of the nature indicated; a knife comprising a shank, a blade removably seated thereon, and a series of yielding riders supported along the cutting edge of said knife independent of said blade.

11. In a fish-cleaning machine, the combination with a fishway, of a fin-cutting instrument, a rotatable guard mounted on said cutting instrument and having wings adapted to engage the fins to be severed by said instrument, and means on said cutting instrument for actuating said guard.

12. In a fish-cleaning machine, the combination with a fishway, of a fin-severing knife overhanging the same and having a substantially flat blade, a laterally-adjustable rotatable guard mounted on the blade and having radially-disposed arms and rods on said arms arranged parallel the axis of rotation of the guard and adapted to engage the fins to be severed by said knife.

13. In a fish-cleaning machine, the combination with a grooved way, of a yielding fin-severing knife overhanging said way, said knife having a substantially flat blade, of a rotatable guard comprising arms longitudinally said axis, journals for the axis horizontally mounted on said blade relatively to the cutting edge, and means by which the guard is rotated.

14. In a machine of the nature indicated; the combination with a knife having a shank formed with a pivot at one end; of a socket carrying a seat for said pivot, trunnions on the socket disposed at an angle to said seat, journals for the trunnions, and means to normally secure said pivot from turning in the socket.

15. In a machine of the nature indicated; a knife-mount comprising a knife-socket having trunnions disposed at an angle to the cutting edge of the knife, journals for the trunnions, a vertically-adjustable base-plate, means to slidably mount said journals on the plate, and a rotatably-adjustable standard supporting said plate.

16. In a machine of the nature indicated, the combination with a fishway, of a vertically-adjustable standard, horizontally-adjustable boxes mounted thereon, a shank provided on its one end with cutting instruments normally extending across said fishway, said shank being pivoted at its other end in said boxes, as and for the purpose set forth.

17. In a machine of the nature indicated; a drag comprising a longitudinally-reciprocal plunger, a frame rotatably mounted thereon, a mangle-rack on said frame, a rotatable pinion, means to insure constant engagement of said rack and pinion, operable jaws carried on said plunger, and means whereby rotation of said frame actuates said jaws.

18. In a machine of the nature indicated; a drag comprising a longitudinally-reciprocal plunger, a frame rotatably mounted thereon, a mangle-rack on said frame, a rotatable pinion held in constant engagement with the rack, operable jaws carried on the plunger, a bar slidably mounted on said plunger, means whereby movement of the bar actuates said jaws, and other means whereby rotation of said frame moves the bar.

19. In a machine of the nature indicated, the combination with a fish-transporting device embodying gripping-jaws, of a severing instrument immovable with the transporting device and being movable across the path of said jaws.

20. In a machine of the nature indicated; the combination with a fish-transporting device adapted to convey the fish by engaging the tail, of a pivotally-mounted tail-severing knife operably related to said device and having the blade at one extremity of the shank, means to normally yieldingly hold said knife in retracted position, and means arranged on said device to operably engage the knife.

21. In a machine of the nature indicated; the combination with a fish-transporting device adapted to convey fish by engaging the tail, of a tail-severing knife comprising a bell-crank-shaped shank and a blade at the end of one arm, means to mount the knife to swing at the point of angle, means to normally yieldingly hold the shank with the blade in retracted position, and means arranged on said device to engage the other arm of the shank and operate the knife.

22. In a machine of the nature indicated, a gripping means, means for operating said means, a cutting means immovable with said gripping means movable across the path of said gripping means, and means carried by said gripping means for operating said cutting means.

23. In a machine of the nature indicated, a sliming apparatus comprising a frame, a horizontal shaft, a cylindrical wiper swingably mounted thereon and operated thereby, a vertical shaft operably connected with the first-named shaft, a pair of yielding arms pivoted thereto, cylindrical wipers mounted on said arms and operated by said vertical shaft, and means to pass a body to be slimed between the wipers.

24. In a machine of the nature indicated, means for conveying a fish-body, a cutter for severing a fish-body from said means, and means carried by said conveying means for operating said cutter.

Signed at Seattle, Washington, this 25th day of April, 1902.

EDMUND AUGUSTINE SMITH.

Witnesses:
 JOHN WALLACE,
 JESSIE S. ROTTENSTEIN.